(12) United States Patent
Sulhoff et al.

(10) Patent No.: US 6,687,049 B1
(45) Date of Patent: Feb. 3, 2004

(54) OPTICAL AMPLIFIERS WITH STABLE OUTPUT POWER UNDER LOW INPUT POWER CONDITIONS

(75) Inventors: James W. Sulhoff, Los Gatos, CA (US); Yongan Wu, San Jose, CA (US); Chia-Chi Wang, Hillsborough, NJ (US)

(73) Assignee: Onetta, Inc., Sunnyvale, CA (US)

( * ) Notice: Subject to any disclaimer, the term of this patent is extended or adjusted under 35 U.S.C. 154(b) by 0 days.

(21) Appl. No.: 09/929,141

(22) Filed: Aug. 15, 2001

Related U.S. Application Data
(60) Provisional application No. 60/302,367, filed on Jul. 3, 2001.

(51) Int. Cl.[7] .............................................. H04B 10/12
(52) U.S. Cl. .............................. 359/341.4; 359/341.41; 359/341.42; 359/341.32
(58) Field of Search ......................... 359/341.4, 341.41, 359/341.32, 341.42

(56) References Cited

U.S. PATENT DOCUMENTS

| | | | | |
|---|---|---|---|---|
| 5,050,949 A | * | 9/1991 | DiGiovanni et al. | 359/337.4 |
| 5,260,816 A | | 11/1993 | Edagawa et al. | 359/341 |
| 5,280,383 A | * | 1/1994 | Federici et al. | 359/341.33 |
| 5,333,089 A | * | 7/1994 | Heidemann | 359/341.4 |
| 5,406,411 A | * | 4/1995 | Button et al. | 359/341.33 |
| 5,430,572 A | * | 7/1995 | DiGiovanni et al. | 359/341.33 |
| 5,453,873 A | | 9/1995 | Millar et al. | 359/341 |
| 5,455,704 A | * | 10/1995 | Mizuochi et al. | 359/179 |

(List continued on next page.)

FOREIGN PATENT DOCUMENTS

| | | |
|---|---|---|
| EP | 0 7343 105 A2 | 9/1996 |
| WO | WO 00/14909 | 3/2000 |
| WO | WO 00/49721 | 8/2000 |

OTHER PUBLICATIONS

Kinoshita et al. Fujitsu Sci. Tech. J. 35, Jul. 1, 1999.*

Delavaux et al. "Optimized Two–Stage In–Line Balanced Optical Amplifier Design" Academic Press, p. 239–243 (1995).

Sun et al. "Optical Fiber Amplifiers for WDM Optical Networks" Bell Labs Journal, p. 187–206, Jan.–Mar., 1999.

Sun et al. "Utra Wide Band Erbium–Doped Fiber Amplifier with 80nm of Bandwidth" OSA Trends in Optics and Photonics, vol. 16 1997.

Takeda et al. "Active Gain Tilt Equalization by Preferentially 1.43µm– or 1.48µmoto Pumped Raman Amplification" OSA Optical Amplifiers and their Applications, vol. 30, p. 101–105 (1999).

One et al. "Automatic Gain Control in Silica–Based EDFA with over 50nm Flat Gain Bandwidth using an all Optical Feedback Loop" 10th Optical Amplifiers and their Applications Technical Digest, Jun. 9–11, 1999.

(List continued on next page.)

Primary Examiner—Thomas G. Black
Assistant Examiner—Stephen Cunningham
(74) Attorney, Agent, or Firm—G. Victor Treyz

(57) ABSTRACT

Optical amplifiers and optical network equipment are provided that have optical gain stages for amplifying optical signals on a fiber-optic communications link. The optical gain stages may be based on optically pumped fiber such as rare-earth-doped fiber. The fiber may be optically pumped using laser diode pumps. A control unit may be provided in the amplifiers or other equipment to control the laser diode pumps. Optical monitors may be used to measure the optical signals in the amplifiers or other equipment. The pump powers of the laser diode pumps may be adjusted in real time by the control unit based on the measured optical signals to suppress gain transients due to input power fluctuations on the link. To minimize the impact of pump-induced noise, the control unit may avoid operating the laser diodes at powers at which the laser diodes are most susceptible to mode partition noise.

19 Claims, 14 Drawing Sheets

U.S. PATENT DOCUMENTS

| | | | | |
|---|---|---|---|---|
| 5,513,029 A | | 4/1996 | Roberts | 359/177 |
| 5,521,753 A | * | 5/1996 | Fake et al. | 359/341.32 |
| 5,673,280 A | | 9/1997 | Grubb et al. | 372/3 |
| 5,710,660 A | * | 1/1998 | Yamamoto et al. | 359/341.44 |
| 5,745,283 A | * | 4/1998 | Inagaki et al. | 359/337.13 |
| 5,778,132 A | * | 7/1998 | Csipkes et al. | 385/135 |
| 5,808,786 A | * | 9/1998 | Shibuya | 359/341.33 |
| 5,838,487 A | | 11/1998 | Nilsson et al. | 359/341 |
| 5,859,938 A | | 1/1999 | Nabeyama et al. | 385/24 |
| 5,861,973 A | | 1/1999 | Inagaki et al. | 359/341 |
| 5,900,969 A | | 5/1999 | Srivastava et al. | 359/341 |
| 5,909,305 A | * | 6/1999 | Kinoshita | 359/337.1 |
| 6,016,218 A | * | 1/2000 | Jo et al. | 359/341.33 |
| 6,049,413 A | | 4/2000 | Taylor et al. | 359/337 |
| 6,061,171 A | | 5/2000 | Taylor et al. | 359/341 |
| 6,081,366 A | | 6/2000 | Kidorf et al. | 359/341 |
| 6,094,298 A | | 7/2000 | Luo et al. | 359/346 |
| 6,115,174 A | | 9/2000 | Grubb et al. | 359/334 |
| 6,134,047 A | * | 10/2000 | Flood et al. | 359/337.12 |
| 6,178,038 B1 | | 1/2001 | Taylor et al. | 359/341 |
| 6,198,572 B1 | | 3/2001 | Sugaya et al. | 359/337 |
| 6,215,581 B1 | | 4/2001 | Yadlowsky | 359/337 |
| 6,222,962 B1 | | 4/2001 | Nilsson | 385/37 |
| 6,246,514 B1 | * | 6/2001 | Bonnedal et al. | 359/341.41 |
| 6,366,393 B1 | * | 4/2002 | Feulner et al. | 220/23.8 |
| 6,366,394 B1 | * | 4/2002 | Begin et al. | 359/341.3 |
| 6,366,395 B1 | * | 4/2002 | Drake et al. | 359/341.41 |
| 6,377,394 B1 | * | 4/2002 | Drake et al. | 359/341.41 |
| 6,384,963 B2 | * | 5/2002 | Ackerman et al. | 359/334 |
| 6,426,833 B1 | * | 7/2002 | Bao | 359/341.32 |
| 6,441,953 B1 | * | 8/2002 | Cowle et al. | 359/341.3 |

OTHER PUBLICATIONS

Kakui et al. "Dynamic–Gain–Tilt–Free Long–Wavelength Band Erbium Doped Fiber Amplifiers Utilizing Temperature Dependent Characteristics of Gain Spectrum" $25^{th}$ Optical Fiber Communication Conference, Technical Digest, p. 6–8, (Mar. 8, 2000).

Masuda "Review of Wideband Hybrid Amplifiers" $25^{th}$ Optical Fiber Communication Conference, Technical Digest, p. 2–4, (Mar. 7, 2000).

Lewis et al. "Low–Noise High Gain Dispersion Compensating Broadband Raman Amplifier" $25^{th}$ Optical Fiber Communication Conference, Technical Digest, p. 5–7, (Mar. 7, 2000).

Sun et al. "Average Inversion Level, Modeling and Physics of Erbium–Doped Fiber Amplifiers" IEEE Journal of Selected Topics in Quantum Electronics, vol. 3, No. 4, Aug. 1997.

* cited by examiner

OPTICAL AMPLIFIERS WITH STABLE OUTPUT POWER UNDER LOW INPUT POWER CONDITIONS

This application claims the benefit of provisional patent application No. 60/302,367, filed Jul. 3, 2001.

BACKGROUND OF THE INVENTION

The present invention relates to fiber-optic communications networks, and more particularly, to optical network equipment such as optical amplifiers in which pump powers are controlled to suppress gain transients while maintaining stable operation.

Fiber-optic networks are used to support voice and data communications. In optical networks that use wavelength division multiplexing, multiple wavelengths of light are used to support multiple communications channels on a single fiber.

Optical amplifiers are used in fiber-optic networks to amplify optical signals. For example, optical amplifiers may be used to amplify optical data signals that have been attenuated by fiber spans and components in fiber-optic links. A typical amplifier may include erbium-doped fiber coils that are pumped with diode lasers.

Optical amplifiers should have low noise figures to ensure satisfactory amplification of the optical signals. Optical amplifiers should also have stable output powers to avoid signal power instabilities. Gain transients should be well controlled, so that amplifier gain remains constant under fluctuating input power conditions.

It is an object of the present invention to provide optical network equipment such as optical amplifiers that suppress gain transients due to fluctuations in input power.

It is also an object of the present invention to provide optical network equipment such as optical amplifiers that exhibit stable output powers while operating under low input power conditions.

SUMMARY OF THE INVENTION

These and other objects of the invention are accomplished in accordance with the present invention by providing optical amplifiers and other optical network equipment for use in fiber-optic communications links in fiber-optic networks. The fiber-optic links may be used to carry optical data signals associated with wavelength-division-multiplexing channels.

The equipment may include optical gain stages. The gain stages may be based on optically pumped fiber such as rare-earth-doped fiber. Laser diode pumps may be used to optically pump the fiber. Input and output taps may be used to monitor the optical input power to the equipment and the optical gain of the gain stages. The pump power of the pumps in the gain stages may be adjusted in real time based on the measured optical powers to suppress gain transients that would otherwise arise due to fluctuations in the input power to the equipment. The pump power of the pumps in the gain stages may be adjusted so that it tracks the measured signal input power. This helps to maintain the gain of the amplifier at a constant level during input power fluctuations.

Copumping and counterpumping arrangements may be used to pump one or more coils of the fiber in the gain stages. Some laser diodes may have a tendency to be unstable and noisy when operated at powers just above the lasing threshold due to mode partition noise. The stability of the amplifier gain and output power may be improved at low input powers by avoiding such unstable operating regimes.

For example, when a coil is pumped by two lasers, the powers of the lasers may be adjusted during-transient control operations so that at low input powers one laser takes over from the other. With this type of arrangement, the power of the surviving laser is made relatively higher, so that it operates well above the noisy operating regime. The dropped laser produces no output power, so that it does not contribute noisy pump power to the coil.

Pump power splitting arrangements, remnant pump arrangements, and proper pump power wavelength selection may also be used to improve the performance of the amplifier under low input power conditions.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
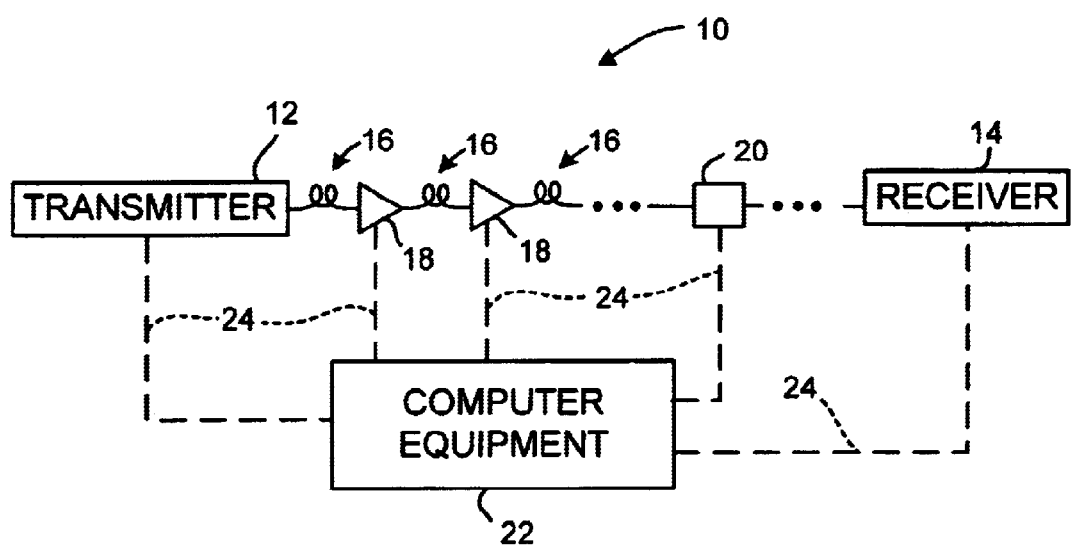
FIG. 1 is a schematic diagram of an illustrative fiber-optic communications link in accordance with the present invention.

An illustrative fiber-optic communications link 10 in an optical communications network in accordance with the present invention is shown in FIG. 1. A transmitter 12 may transmit information to a receiver 14 over a series of fiber links. Each fiber link may include a span 16 of optical transmission fiber. Fiber spans 16 may be on the order of 40–160 km in length for long-haul networks or may be any other suitable length for use in signal transmission in an optical communications network. Link 10 may be a point-to-point link, part of a fiber ring network, or part of any other suitable network or system.

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1527–1605 nm. These are merely illustrative system characteristics. If desired, fewer channels may be provided (e.g., one channel), more channels may be provided (e.g., hundreds of channels), signals may be carried on multiple wavelengths, signals may be modulated at slower or faster data rates (e.g., at approximately 2.5 Gbps for OC-48 or at approximately 40 Gbps for OC-768), and different carrier wavelengths may be supported (e.g., individual wavelengths or sets of wavelengths in the range of 1240–1670 nm).

Optical amplifiers 18 may be used to amplify optical signals on link 10. Optical amplifiers 18 may include booster amplifiers, in-line amplifiers, and preamplifiers. Optical amplifiers 18 may be rare-earth-doped fiber amplifiers such as erbium-doped fiber amplifiers, amplifiers that include discrete Raman-pumped coils, amplifiers that include pumps for optically pumping spans of transmission fiber 16 to create optical gain through stimulated Raman scattering, semiconductor optical amplifiers, or any other suitable optical amplifiers.

Link 10 may include optical network equipment such as transmitter 12, receiver 14, and amplifiers 18 and other optical network equipment 20 such as dispersion compensation modules, dynamic filter modules, add/drop multiplexers, optical channel monitor modules, Raman pump modules, optical switches, etc. If desired, some of this equipment may be installed in the midstage of an amplifier 18. For clarity, aspects of the present invention will be described primarily in the context of optical network equipment 20 such as optical amplifiers 18. This is, however, merely illustrative. The features of the present invention may be used with any suitable optical network equipment having controllable gain elements if desired.

Computer equipment 22 may be used to implement a network management system. Computer equipment such as computer equipment 22 may include one or more computers or controllers and may be located at network nodes and one or more network management facilities. As indicated by lines 24, the network management system may communicate with optical amplifiers 18, transmitter 12, receiver 14 and other optical network equipment 20 using suitable communications paths. The communications paths may be based on any suitable optical or electrical paths. For example, communications paths 24 may include service or telemetry channel paths implemented using spans 16, may include wired or wireless communications paths, may involve communications paths formed by slowly modulating the normal data channels on link 10 at small modulation depths, etc. Paths 24 may also be used for direct communications between amplifiers 18 and other optical network equipment.

Computer equipment 22 may be used to gather spectral information from transmitter 12 (e.g., an output power spectrum), receiver 14 (e.g., a received power spectrum), and amplifiers 18 and other equipment 20 (e.g., input and output power spectra and gain spectra).

If amplifiers 18 or other equipment in link 10 have spectral adjustment capabilities, computer equipment 22 may use the gathered spectral information to determine how the spectra of amplifiers 18 and the other equipment in link 10 are to be controlled. Computer equipment 22 may issue commands to amplifiers 18, transmitters 12, receivers 14, and other equipment 20 that direct this equipment to make appropriate spectral adjustments and that direct this equipment to maintain certain gain or output power settings. These adjustments may be used to optimize the gain or signal spectrum flatness along link 10, may be used to optimize the end-to-end or node-to-node signal-to-noise ratio across the signal band or spectrum, or may be used to implement any other suitable control or optimization functions for link 10.

In a typical wavelength-division-multiplexing configuration, multiple optical data channels are carried over a link such as link 10. Each channel has an associated wavelength. Due to an intentional system reconfiguration or an accidental fiber cut, a number of the channels (e.g., 20 out of 40 total channels) may be abruptly dropped. Channels may also be added (e.g., due to a system reconfiguration). In a typical network, any number of channels may be added or dropped.

Figure 2:
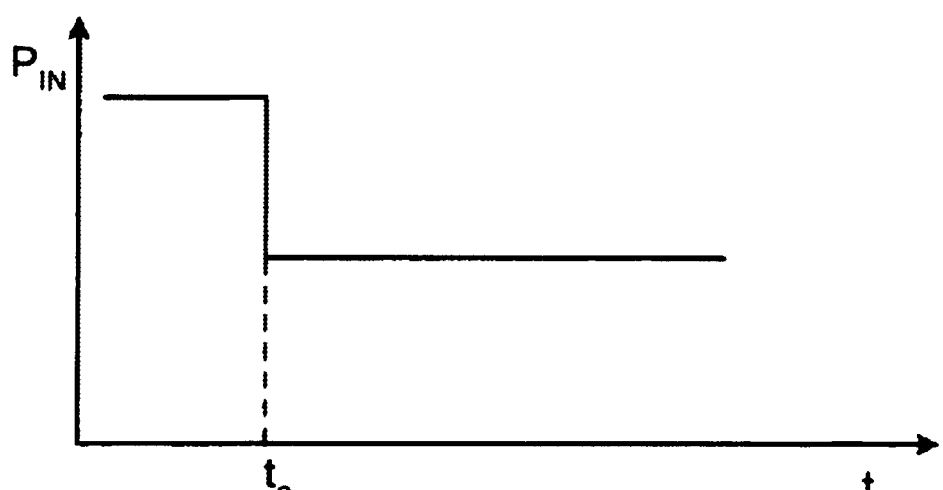
FIG. 2 is a graph showing how the total input power of the optical signals provided to an amplifier may change suddenly when channels are dropped and added.
Figure 3:
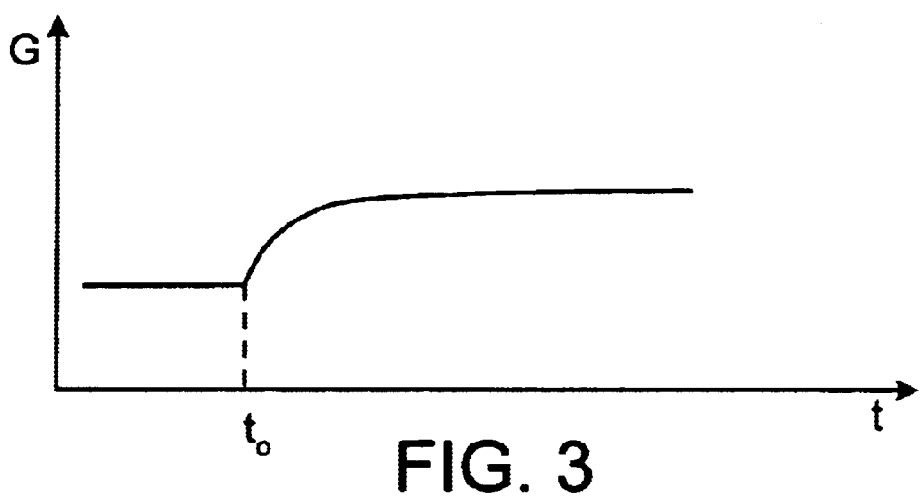
FIG. 3 is a graph showing how the gain in an amplifier without transient control capabilities experiences significant transient effects when the input power to the amplifier fluctuates as shown in FIG. 2.

If the total number of channels being provided at the input to a given amplifier drops in half, the total input power for the amplifier may also drop in half (or some other amount based on the channel powers), as shown in FIG. 2. This type of input power fluctuation will cause transients in the gain of the amplifier if the amplifier does not have transient control capabilities. In particular, because the signal loading is suddenly less than the previous steady-state value, the gain of the amplifier will rise suddenly as shown in FIG. 3, if the amplifier gain is not controlled. In an erbium-doped fiber amplifier, for example, the gain will rise with a time constant on the order of microseconds due to a rise in the inversion level of the erbium-doped fiber in the amplifier. The remaining channels in the system will experience the increased gain. As a result, the output powers of these channels from the amplifier will track the curve shown in FIG. 3 and will be too high.

Figure 4:
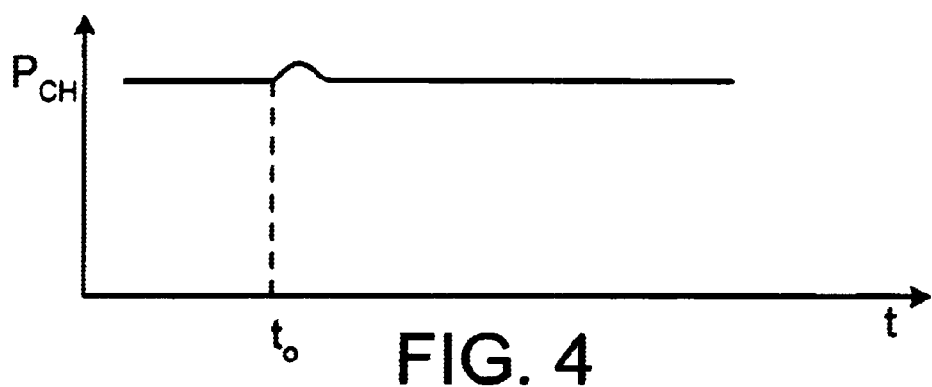
FIG. 4 is a graph showing how gain transients may be suppressed in an amplifier with transient control capabilities in accordance with the present invention.

Amplifiers 18 may be provided with transient control arrangements that ensure that the gain of a given amplifier will not vary significantly from its set point, even if the input power to the amplifier fluctuates abruptly. The response of an illustrative amplifier 18 with transient control capabilities is shown in FIG. 4. As shown in FIG. 4, although the input power changes abruptly at time t (FIG. 2), the output power per channel $P_{CH}$ does not vary significantly. Transient control may be provided by using control unit 44 to adjust the powers of optical pumps in amplifier 18 based on optical power measurements made in amplifier 18.

Figure 5:
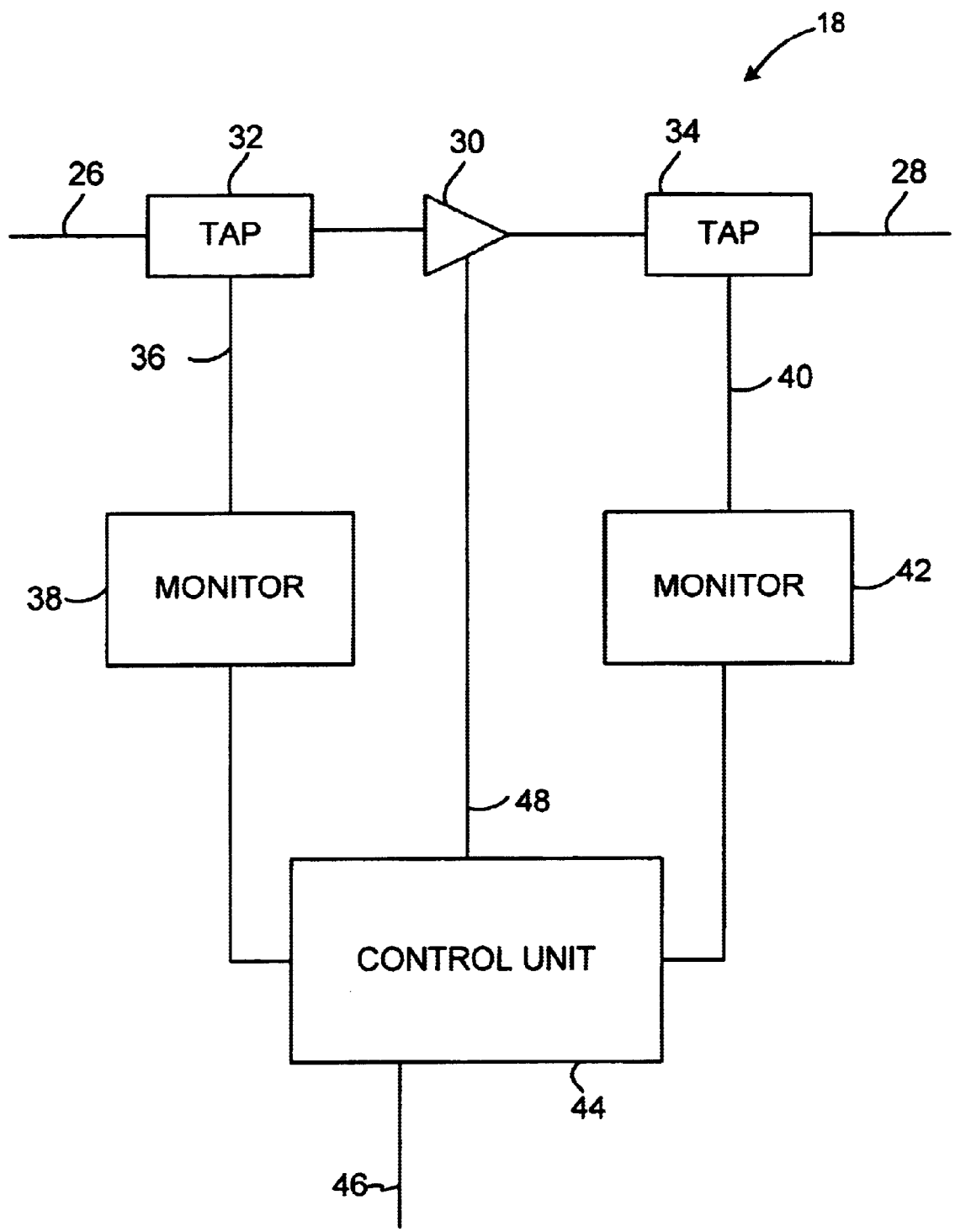
FIG. 5 is a schematic diagram of an illustrative optical amplifier in accordance with the present invention.

An illustrative amplifier 18 with transient control capabilities is shown in FIG. 5. Optical signals from a span of fiber 16 may be provided to input fiber 26. Corresponding amplified output signals may be provided at output fiber 28. Optical gain may be provided by one or more gain stages such as gain stage 30. Gain stages 30 may include, for example, one or more coils of optically-pumped rare-earth-doped fiber such as erbium-doped fiber, fiber such as dispersion-compensating fiber or other fiber that is optically pumped to produce Raman gain through stimulated Raman scattering and other gain elements. Pumps such as laser diode pumps or other suitable sources of pump light may be used to optically pump the fiber in stages 30.

Taps such as taps 32 and 34 may be used to tap optical signals traveling along the main fiber path through amplifier 18. Taps 32 and 34 may be any suitable optical taps such as 2%/98% wavelength-insensitive taps.

Tap 32 may be used to monitor the total input power to amplifier 18. Tapped signals from input 26 may be provided to fiber 36 by tap 32. Optical monitor 38 may measure the power of the signals provided over fiber 36 from tap 32. Tap 34, fiber 40, and optical monitor 42 may be used to measure the total output power of amplifier 18.

Operation of amplifier 18 may be controlled using control unit 44. Control unit 44 may be based on any suitable control electronics and may include one or more microprocessors, microcontrollers, digital signal processors, field-programmable gate arrays or other programmable logic devices, application-specific integrated circuits, digital-to-analog converters, analog-to-digital converters, analog control circuits, memory devices, etc.

Monitors 38 and 42 may be based on any suitable monitoring circuitry. For example, monitors 38 and 42 may include photodetectors that convert light signals into electrical signals and transimpedance amplifiers that convert current signals from the photodetectors into voltage signals for processing by analog or digital circuitry in monitors 38 and 42 or in control unit 34.

By tapping the input and output power for amplifier 18, the average gain level of amplifier 18 and stage 30 may be monitored in real time. Control unit 44 may determine the average gain of amplifier 18 in real time by calculating the ratio of the measured total output power of amplifier 18 to the measured total input power to amplifier 18. This allows the control unit 34 to control the pump power for stage 30 in real time to ensure that the gain of stage 30 and amplifier 18 remains constant at a desired gain setting. In amplifiers 18 with multiple gain stages 30, gain transients may be controlled by using input and output taps and monitors before and after each of the gain stages, by using input and output taps and monitors that span multiple gain stages, by using other suitable monitoring arrangements, or by using a combination of such arrangements.

Another suitable gain transient suppression technique involves monitoring the powers associated with one or more active channels using an optical channel monitor or an optical monitor having a spectral filter that isolates an active channel. With this type of technique, the output power per channel may be measured. Control unit 44 may adjust stage 30 in real time to maintain the measured output power per channel at a constant level, which suppresses gain transients.

If desired, output power measurements on the optical signals may be used in suppressing transients due to input power fluctuations. For example, control unit 44 may monitor the output power from amplifier 18 using tap 34 and monitor 42 and may control the pump power in stages such as stage 30 based on the measured output power. If the number of channels amplified by amplifier 18 remains constant, using control unit 44 to maintain the output power of amplifier 18 at a constant desired level even as the input power level varies will suppress output power fluctuations.

Control unit 44 may control stages such as stage 30 based on input power measurements. For example, the pump power for stage 30 may be increased or decreased appropriately as soon as a significant input power fluctuation is detected. This type of feed-forward control scheme may be used with or without using feedback. Feedback control techniques involve measuring the gain or output power of amplifier 18 and adjusting the pump level or other parameter of amplifier 18 in real time to maintain a desired gain or output power level. Such techniques may be used independently or in combination with feed-forward control techniques.

If desired, gain transient control techniques may be used that involve one or more input or output spectral filters. Such filters may modify the entire spectra of the tapped input and output signals or may be used to make power measurements for a particular channel or channels. The modified measured powers or the power of the particular channel or channels may be used in a feedback control scheme or other suitable control scheme for adjusting the pump powers. Spectral filters may be used to modify the spectral shape of the tapped light that is monitored by monitors 38 and 42, so that feedback and feed-forward techniques may be used when the gain spectrum of amplifier 18 or the gain spectrum of the rare-earth-doped fiber or other gain medium in amplifier 18 is not flat.

Control unit 44 may communicate with the network management system or other external computer equipment over path 46. Control unit 44 and path 46 may support any suitable communications protocols. For example, control unit 44 and path 46 may be used to support Ethernet protocols or RS-232 protocols.

The network management system may be implemented on computers at network nodes such as the nodes at which transmitter 12 and receiver 14 are located and at network management facilities or other suitable network locations. The network management system may gather information from amplifier 18 such as information on the current gain that is measured using taps 32 and 34 and monitors 38 and 42.

The network management system may be used to send commands to amplifier 18 and other equipment in the network. As an example, the network management system may send commands to amplifier 18 that direct amplifier 18 to establish and maintain a particular gain setting or output power. Commands may be sent to amplifier 18 that place amplifier 18 in different operating modes. For example, amplifier 18 may be placed in a constant gain mode in which the gain of amplifier 18 is automatically held at a constant level, a constant output power mode in which the output power of amplifier 18 is automatically held constant, or a constant current mode in which the drive currents for the pump lasers are automatically held at a constant level.

If desired, additional components may be provided in amplifier 18, such as additional taps for optical monitoring, filters (e.g., static spectral filters and dynamic spectral filters), wavelength-division-multiplexing couplers, circulators, isolators, attenuators (e.g., variable optical attenuators), active or passive dispersion-compensating elements, optical switches, gain elements, optical channel monitors, or any other suitable components. Add/drop multiplexers, switches, dispersion-compensation modules, and other equipment may be installed in amplifiers 18 or used with amplifiers 18 if desired. The components and equipment may be optically coupled at any suitable location in the fiber path between input 26 and output 28.

The arrangement of FIG. 5 is merely illustrative. Amplifier 18 may be based on discrete gain stages such as gain stage 30, may be based on distributed gain stages such as distributed Raman gain stages, may be based on any other suitable gain stage, or may be based on combinations of such gain stages. If desired, the amplifier components of FIG. 5 may be used in other optical network equipment 20.

Control unit 44 may process information from monitors such as monitors 38 and 42 and may produce corresponding pump control signals at output 48. The pump control signals may be used to adjust the laser diode pumps or other suitable pumps in gain stages such as gain stage 30. If desired, groups of pumps may be controlled in tandem. Pumps may also be controlled individually.

Gain transients in amplifier 18 and gain stages such as gain stage 30 may be controlled using a feed-forward approach in which a feed-forward pump power for a given pump, $P_{PUMP-FF}$, is calculated based on the measured input power at monitor 38, as shown in equation 1.

$$P_{PUMP-FF} = f(P_{IN}) \qquad (1)$$

The function f may be determined empirically or may be determined by modeling the pump behavior of the amplifier. In general, the feed-forward pump power that is used will increase as the total input signal rises and decrease as the total input signal falls. As an approximation, the required pump power will scale almost linearly with the input power that is being amplified for most erbium-doped and other rare-earth-doped amplifier arrangements. In Raman gain stages, the fractional increase in the pump power that is required to compensate for a given rise in input power may be significantly less than the fractional increase in the input power. For clarity, the transient control features of the present invention will be described primarily in the context of erbium-doped fiber amplifiers. This is, however, merely illustrative. Any suitable type of amplifier gain stage may use these features if desired.

Figure 6:
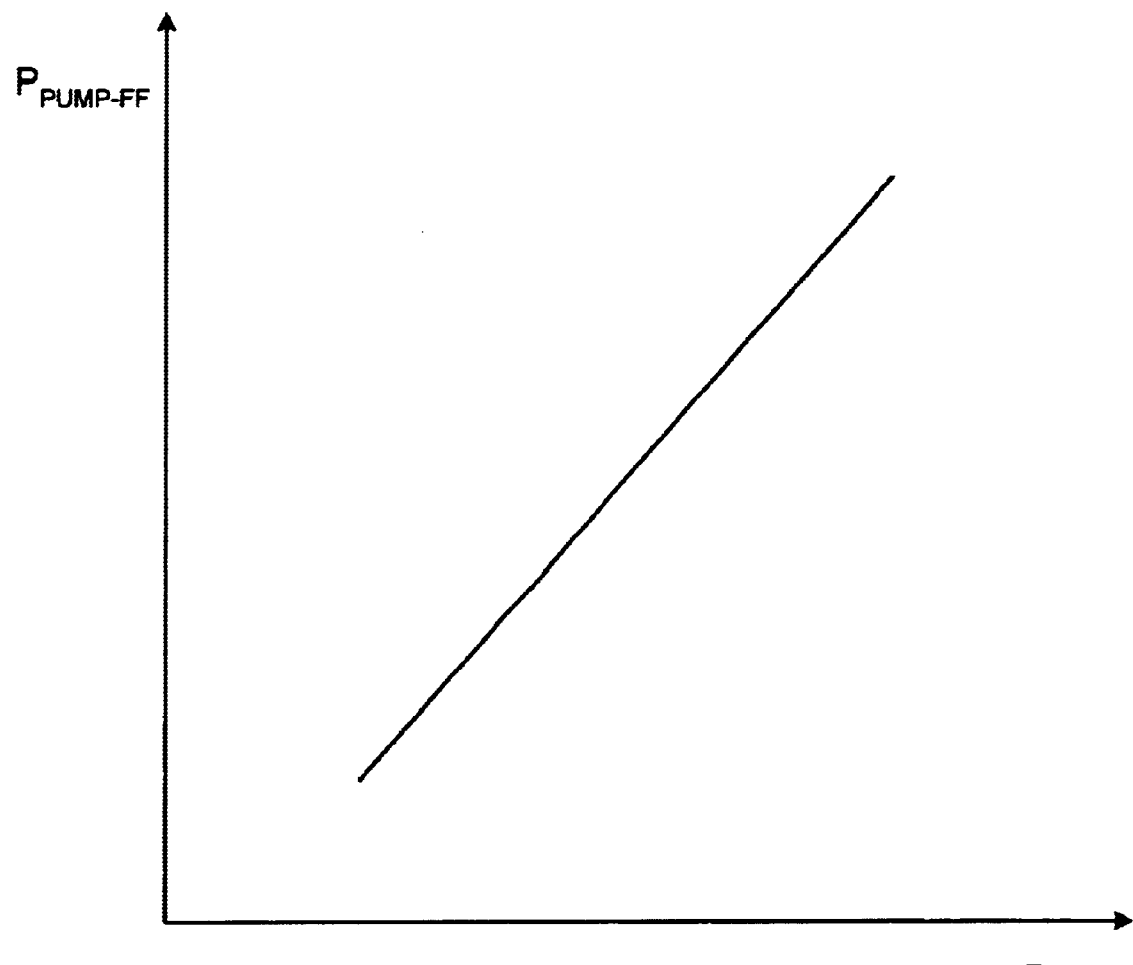
FIG. 6 is a graph showing an illustrative relationship between feed-forward pump power and measured input power that may be used in an amplifier in accordance with the present invention.

A graph of an illustrative feed-forward function f of the type set forth in equation 1 is shown in FIG. 6. When control unit 44 detects a change in the input power to amplifier 18, control unit 44 may direct the pumps in amplifier 18 to change the pump power applied to the optically-pumped fiber in amplifier 18 according to equation 1. Equation 1 and other pump power relationships used for controlling the optical pumping of the fiber in amplifier 18 as a function of measured input power may be stored in a lookup table or other data structure in control unit 44 (e.g., for use by a microprocessor, digital signal processor, field-programmable gate array, or other programmable logic device, etc.) or may be implemented by control unit 44 using any other suitable technique.

With the approach of equation 1, the pump power that is used in amplifier 18 is determined based on the measured total input power to the module. This allows the amplifier 18 to anticipate the impact that a change in input power will have on the amplifier, even before that impact is measured at the output.

A linear version of equation 1 that may be used by control unit 44 when controlling the pump power is given in equation 2.

$$P_{PUMP-FF} = a\, P_{IN} + b \qquad (2)$$

In equation 2, a and b are fitting parameters that may be determined experimentally. The parameter b is zero in the example of FIG. 6. If desired, analytic forms for equation 1 may be provided using second-order equations, higher-order equations, piece-wise linear or higher-order equations, or any other suitable expressions or relationships.

If the gain spectrum of amplifier 18 is flat, if a gain flattening filter or other spectral flattening arrangement is used in amplifier 18 to flatten the gain spectrum of amplifier 18, or if gain measurement errors due to gain ripple are acceptable, the average gain of amplifier 18 may be measured in real time by monitoring the input and output power of amplifier 18 using taps such as taps 32 and 34. The gain may be calculated using equation 3.

$$G = P_{OUT}/P_{IN} \qquad (3)$$

The value of $P_{IN}$ may be measured using tap 32 and monitor 38. The value of $P_{OUT}$ may be measured using tap 34 and monitor 42. To ensure accurate gain measurements, control unit 44 may, if desired, take into account the optical delay time associated with passing through the fiber between tap 32 and tap 34 when performing the calculation of equation 3. There are also delay times associated with the various fiber lengths between the input tap 32 at which the input signals are measured and the locations at which pump light is launched into the fiber in amplifier 18. If desired, control unit 44 may take these delays into account when determining the precise times at which the feed-forward pump powers are to be produced by the different pumps.

Control unit 44 may adjust the pump power of amplifier 18 to maintain the total gain of equation 3 at a constant level. This type of feedback approach is suitable when the gain spectrum of module 36 is relatively flat or when inaccuracies due to spectral variations in the gain of amplifier 18 may be tolerated. If the gain spectrum of amplifier 18 is not flat, spectral filtering arrangements may be used at the input or output monitors or both the input and output monitors to make gain measurements spectrally insensitive. Spectral filter arrangements may also be used to improve the accuracy of feed-forward control techniques when the gain media (e.g., the erbium-doped fiber) in amplifier 18 does not have a flat gain spectrum. For clarity, the transient control features of the present invention are described primarily in the context of monitoring schemes without spectral filtering. This is, however, merely illustrative.

To maintain a constant value for G of equation 3, a gain error parameter may be calculated by control unit 44 using equation 4.

$$E = G - G_D \qquad (4)$$

In equation 4, $G_D$ is the desired (constant) gain for amplifier 18 and E is the gain error parameter. The gain error parameter E may be used by control unit 44 to calculate the feedback pump power $P_{PUMP-FB}$ for the pumps to apply to the optically-pumped fiber in amplifier 18 as shown in equation 5.

$$P_{PUMP-FB} = \alpha E + \beta \int E + \gamma E' \qquad (5)$$

In equation 5, α, β, and γ are fitting parameters that may be determined experimentally. Equation 5 is based on the well-known proportional-integral-derivative (PID) method. This is merely an illustrative feedback control technique that may be used. Any other suitable feedback technique may be used to calculate the pump power if desired.

If desired, feed-forward control schemes such as those described in connection with equations 1 and 2 may be used with feedback control schemes such as those described in connection with equations 3–5. For example, control unit 44 may process input power information to calculate a feed-forward pump contribution $P_{PUMP-FF}$ using equation 1 or 2. Control unit 44 may also process input and output power information to calculate a feedback pump contribution $P_{PUMP-FB}$ using equations 3–5. These contributions to the calculated pump power of amplifier 18 may be combined using any suitable combining function g, as set forth in equation 6.

$$P_{PUMP}=g(P_{PUMP-FF}, P_{PUMP-FB}) \quad (6)$$

As an example, $P_{PUMP}$ may be calculated by linearly combining $P_{PUMP-FF}$ and $P_{PUMP-FB}$ as set forth in equation 7.

$$P_{PUMP}=P_{PUMP-FF}+P_{PUMP-FB} \quad (7)$$

An advantage of using a hybrid control scheme is that it may allow transients to be controlled more accurately than would be possible using a less sophisticated control scheme. For example, the feed-forward contribution in the hybrid control scheme may allow the amplifier to respond relatively quickly to input power variations and the feedback contribution in the hybrid control scheme may allow the module to correct for gain drift arising from fiber and component aging and feed-forward pump calibration errors.

In general, amplifiers 18 may have one or more gain stages such as gain stage 30 of FIG. 5. Each gain stage 30 may have one or more coils or lengths of optically pumped fiber. Each coil or length of fiber may be pumped by one or more pumps. The pumps may be based on laser diodes, fiber lasers, or other suitable sources of pump light. For clarity, the present invention will be described primarily in the context of diode lasers.

Figure 7A:
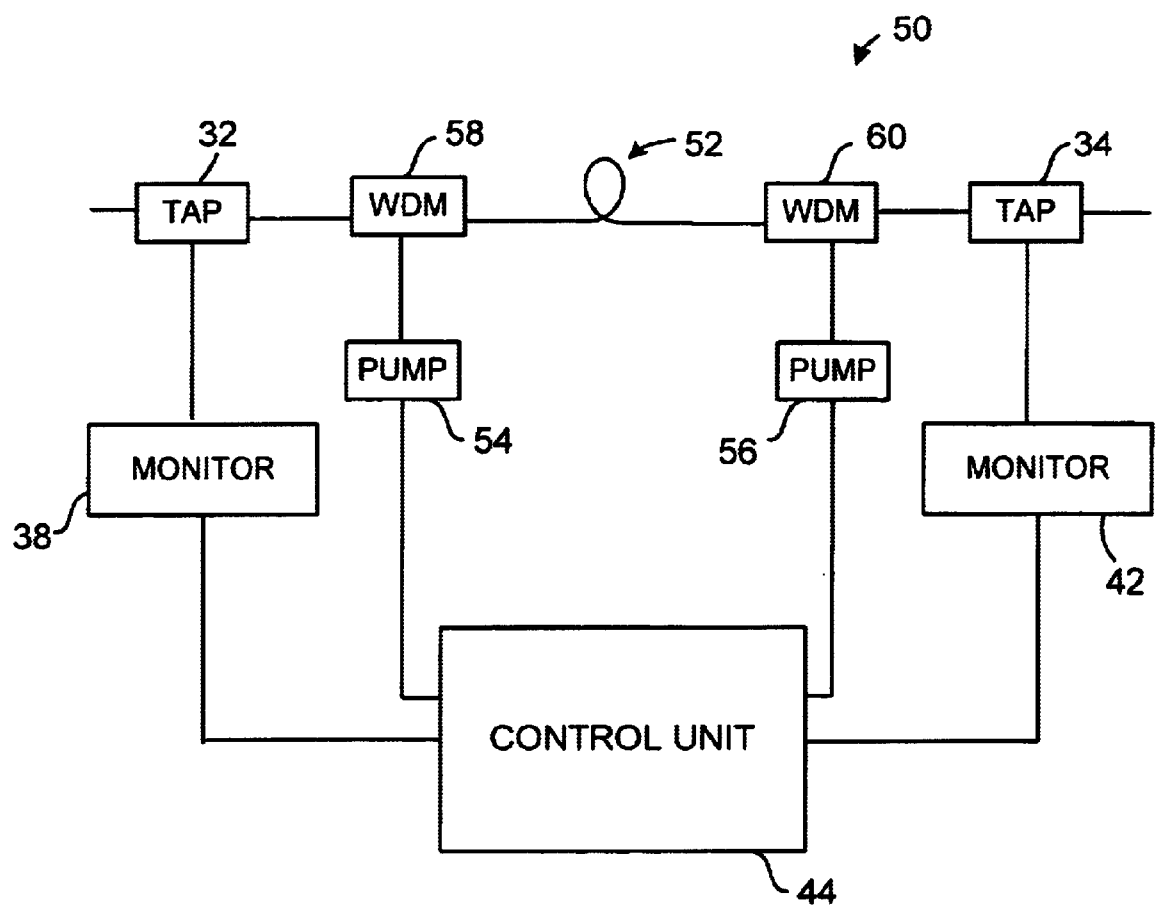
FIG. 7a is a schematic diagram of an optically-pumped coil with transient control in accordance with the present invention.

An illustrative amplifier portion 50 based on a rare-earth-doped coil 52 such as an erbium-doped fiber coil is shown in FIG. 7a. Amplifier portion 50 may be a gain stage 30, an amplifier 18, or a part of a gain stage 30 or amplifier 18. Coil 52 of amplifier portion 50 may be copumped using pump 54. Pump light from pump 54-may be coupled into coil 52 using wavelength-division-multiplexing coupler 58 or another suitable pump coupler. Coil 52 may be counterpumped using pump 56 and wavelength-division-multiplexing coupler 60 or another suitable pump coupler. Pumps 54 and 56 may be based on single diode lasers or multiple diode lasers that have been combined to form pumps using polarization beam combiners or wavelength-division-multiplexing couplers or other suitable combining arrangements.

In configurations such as the configuration of FIG. 7a in which a single fiber coil is pumped by a copumping laser and a counterpumping laser, it may be desirable to pump relatively more strongly with the copump laser rather than the counterpump laser, to enhance the noise figure performance of coil 52. The first coil may be pumped more strongly than the second coil at some or all of the pump power levels that are needed during pumping of coil 52 to produce a desired transient-suppressed gain level.

Some diode lasers such as pump lasers operating at wavelengths in the vicinity of 980 nm may be noisy under low power operating conditions. Pump noise may produce instabilities in the amplified optical signals in coils such as coil 52, which can adversely affect the quality of the signals that are received at receiver 14 (FIG. 1).

The pump noise exhibited by diode lasers such as 980 nm diode lasers arises from the finite number of longitudinal modes that are supported by such lasers. As control unit 44 tries to smoothly increase the pump power from below the pump's lasing threshold, the output power may increase in a discontinuous fashion due to mode hopping. The same behavior may be exhibited when control unit 44 tries to smoothly decrease the pump power near the pump's lasing threshold. The noise caused by mode hopping is called mode partition noise.

When the output power of the pump laser is sufficiently large (e.g., greater than 5–10 mW, the discontinuous output power characteristic of the laser tends to become negligible. The mode partition noise associated with pump lasers such as 980 nm pump lasers therefore tends to be significant only when the operating power of the pump lasers is relatively low. Other diode lasers that may be used as pumps such as 1480 nm laser diodes may be less prone to this type of behavior, but such lasers may not always be suitable for providing low amplifier noise figures at high powers. For clarity, pumps such as 980 nm pumps and pumps operating at nearby wavelengths and having the pumping characteristics of 980 nm laser diodes are referred to herein collectively as "980 nm pumps" and pumps such as 1480 nm pumps and pumps operating at nearby wavelengths and having the pumping characteristics of 1480 nm laser diodes are referred to herein collectively as "1480 nm pumps."

One approach for suppressing pump-induced signal power instabilities from operating pumps at low powers involves independently controlling the two pumps that are used to pump a given coil such as coil 52 of FIG. 7a. At high signal input powers, both pumps may be operated at relatively high pump powers to ensure operation of the coil at a suitable inversion level. At low signal input powers, at which the pumps would both normally be operating at low powers near the lasing threshold, one of the pumps may be turned off and the power of the other pump may be increased by a corresponding amount to compensate. By increasing the power of the active pump by an appropriate amount, the total power of the pump light that is produced for pumping the coil may be maintained at the same level that would have been produced if both pumps were used (neglecting the small differences in the amount of pump power that is required to produce a given inversion level in the fiber when pumping the fiber with one pump instead of two pumps). Because the pump light is produced by a single laser that is operating relatively far above its lasing threshold rather than two noisy low power lasers, the pump light from the single active laser is generally less noisy than the pump light that would have been produced using a conventional two-pump scheme with both pumps operating.

The two pumps that are used to pump the coil 52 or other medium in amplifier 18 may be referred to as first and second pumps. A pump power $P_1$ may be produced by the first pump and a pump power $P_2$ may be produced by the second pump. The first pump may be copumping pump 54 and the second pump may be counterpumping pump 56. In general, either the copump or the counterpump may be turned off in the low power regime. In the examples shown in the drawings (e.g., FIG. 7a) that have separately controllable copumping pump light and counterpumping pump light, the counterpump or downstream pump is generally turned off before the copump or upstream pump, as this tends to produce the most satisfactory noise figure performance. This is, however, merely an illustrative approach.

Figure 7B:
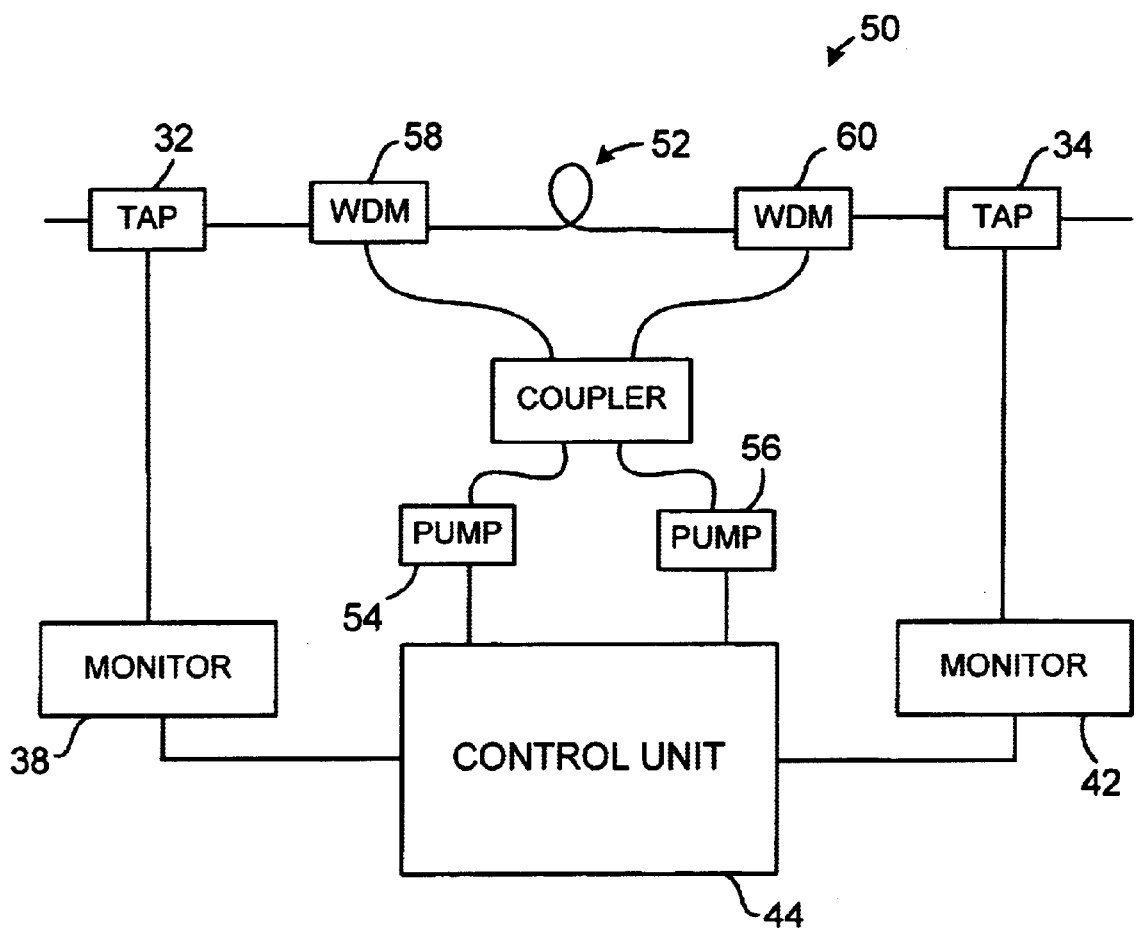
FIG. 7b is a schematic diagram of a coil that is optically pumped using a redundant pumping arrangement in accordance with the present invention.

Another suitable approach is shown in FIG. 7b. As shown in FIG. 7b, the pump power from pumps 54 and 56 may be combined using a coupler 55 (e.g., a 2×2 coupler). With the type of arrangement shown in FIG. 7b, the pump power $P_1$ from pump 54 is applied to fiber 52 using both copumping and counterpumping and the pump power $P_2$ from pump 56 is applied to fiber 52 using both copumping and counterpumping. The FIG. 7b configuration provides pump redundancy, so that the fiber 52 will still be pumped by some pump light even in the event that one of pumps 54 and 56 fails.

Figure 8:
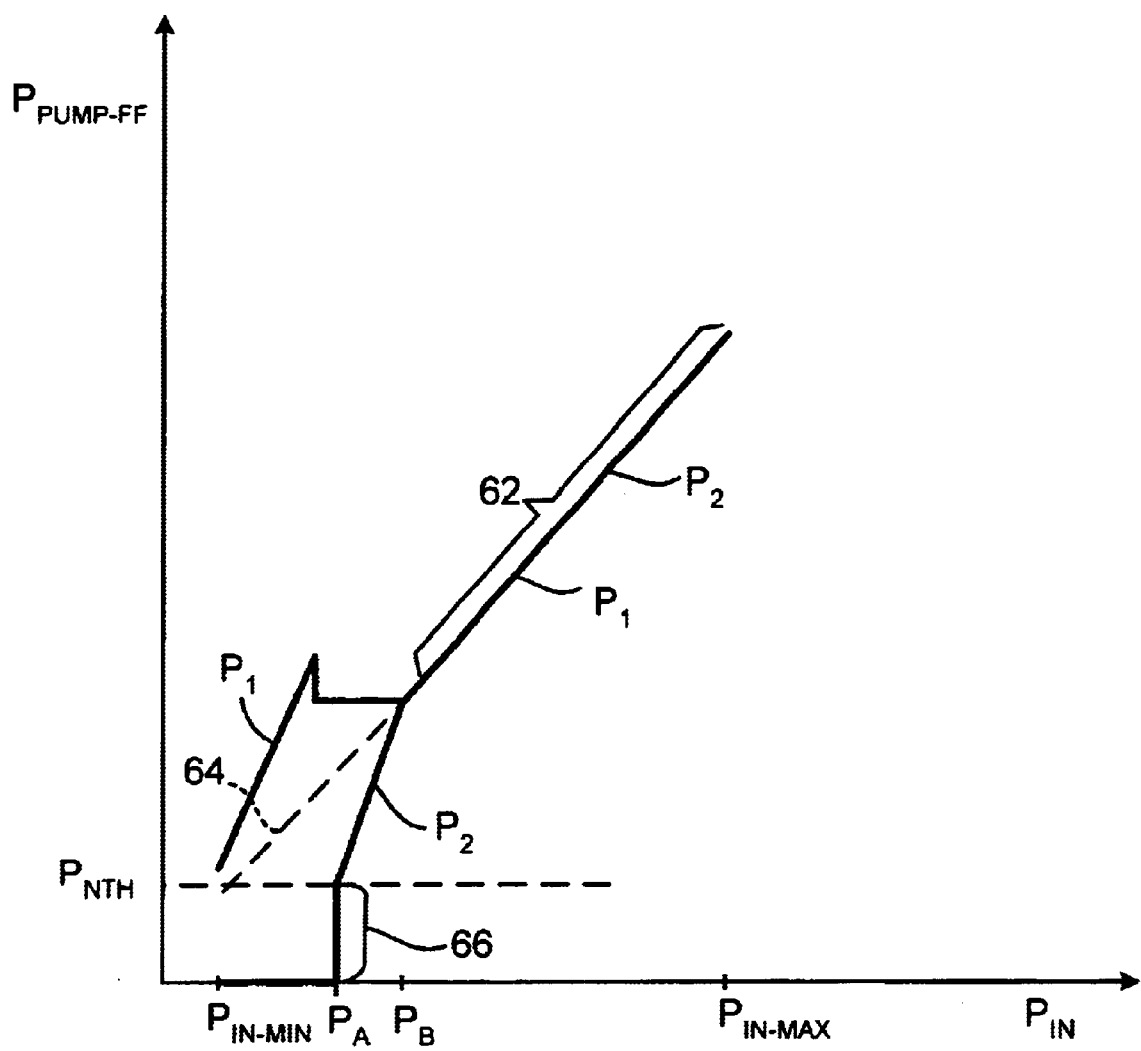
FIG. 8 is a graph showing an illustrative relationship between feed-forward pump power and measured input power that may be used when multiple pumps are controlled independently in an amplifier in accordance with the present invention.

An illustrative pump power relationship that may be used when pumping a coil 52 in an amplifier 18 such as an amplifier based on an amplifier portion 50 such as shown in FIG. 7a or 7b with pumps operating at $P_1$ and $P_2$ is shown in FIG. 8. In FIG. 8 and the other drawings, it is generally assumed that the pump power is being varied as a function of measured input power $P_{IN}$ (e.g., using a feed-forward relationship or a hybrid pump power relationship). The same types of relationships may be used if only feedback control techniques are involved in controlling pump power and other optical signals (e.g., output signals) are measured. The pump power relationship of FIG. 8 and the other drawings may be stored using a lookup table or other storage arrangement in control unit 44.

In operation, the input power $P_{IN}$ may be measured by control unit 44 using input tap 32 and monitor 38. Control unit 44 may control pumps 54 and 56 according to the relationships of FIG. 8 to produce powers $P_1$ and $P_2$ that maintain the gain or output power at a desired level, thereby suppressing gain or output power transients, while ensuring satisfactory low power stability for coil 52 by avoiding the operating regimes for the pumps in which mode partition noise is significant.

The highest input powers (at which $P_{IN}$ is near or equal to its maximum value of $P_{IN-MAX}$) are generally measured when most or all channels are operating on link 10. The lowest input powers (at which $P_{IN}$ is near or equal to its minimum value of $P_{IN-MIN}$) are generally measured when few channels are operating on link 10 or when only a single channel is operating on link 10. Amplifiers 18 that follow relatively short fiber spans 16 tend to have the highest maximum input powers, because the short span lengths tend to result in high channel powers due to low fiber span attenuation levels. The amplifiers 18 that follow relatively long fiber spans 16 tend to have the smallest minimum input powers and may be particularly susceptible to pump power mode partition noise effects.

In the example of FIG. 8, the low pump power regime in which mode partition noise is significant is indicated by a threshold power $P_{NTH}$. When pumps are operated at output powers below this value, the pumps tend to be noisier than when the pumps are operated at powers above this value due to mode partition noise. The value of $P_{NTH}$ varies depending on the particular laser design being used. For typical 980 nm lasers $P_{NTH}$ may be on the order of 5–10 mW, but this is merely illustrative.

To avoid pump-induced gain instabilities in amplifiers 18, it is desirable to avoid operating the pumps at powers less than $P_{NTH}$. At high measured input powers $P_{IN}$, control unit 44 may operate both lasers at powers $P_1$ and $P_2$ that are well above $P_{NTH}$, as shown by line segment 62. At low measured input powers $P_{IN}$, control unit 44 might normally operate the pumps so that pump powers $P_1$ and $P_2$ fall on dotted line 64. This would cause both pumps to have pump powers less than $P_{NTH}$ for a measured input power of $P_{IN-MIN}$, which could cause coil 52 to be subject to the effects of significant mode partition noise.

Accordingly, at the lowest measured input powers ($P_{IN}<P_A$) the counterpump 56 may be turned off, so that the pump power $P_2$ is zero. The pump power $P_1$ of copump 54 may be increased by a corresponding amount to compensate for the loss of power $P_2$, as shown in FIG. 8. This may ensure that the appropriate total pump power is provided to coil 52. To smooth the transition between the operating regime in which both $P_1$ and $P_2$ are being produced to the operating regime in which only $P_1$ is being produced, it may be desirable to begin favoring $P_1$ over $P_2$ at somewhat higher measured input powers (e.g., when $P_A<P_{IN}<P_B$), as shown in FIG. 8.

Figure 9:
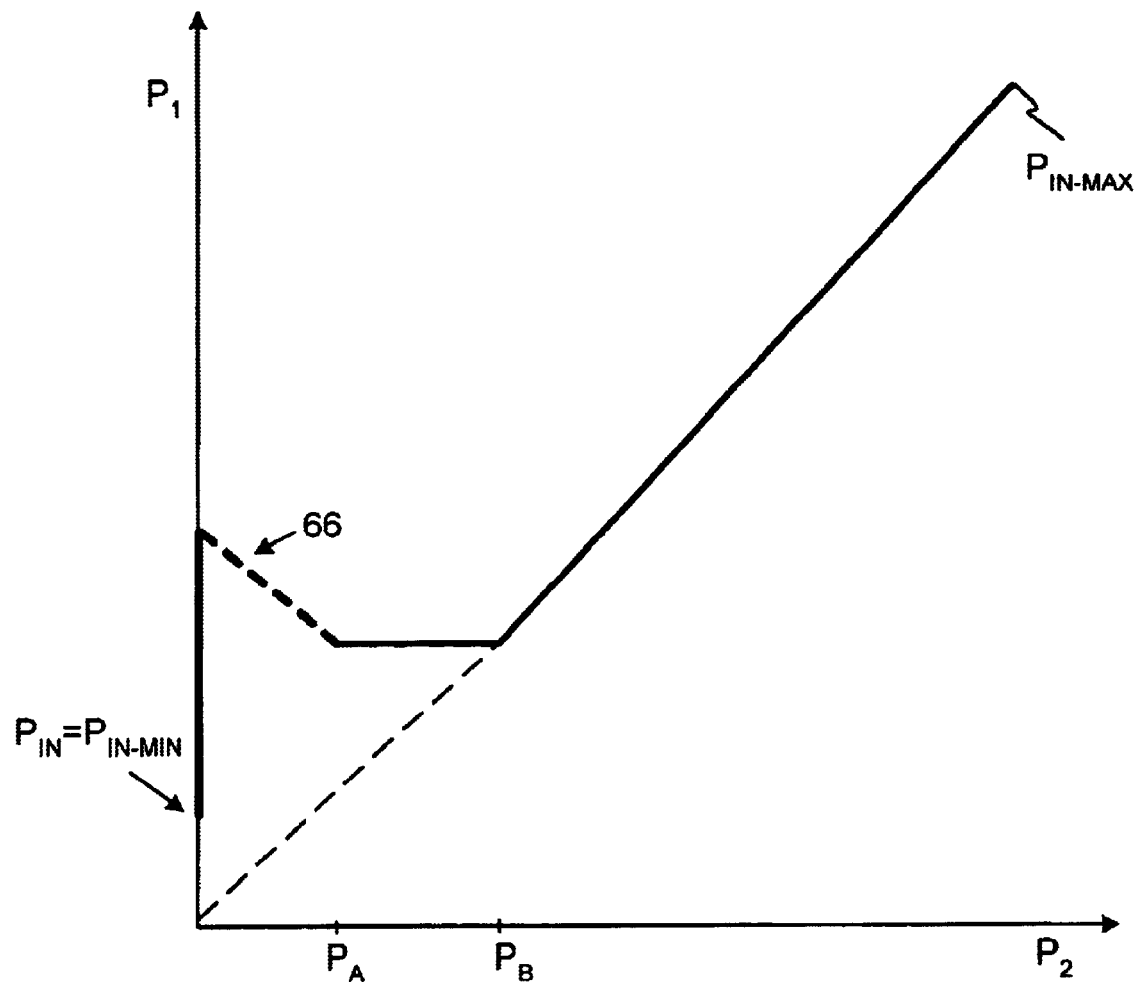
FIG. 9 is another graphical representation of the illustrative relationship between feed-forward pump power and measured input power of FIG. 8 in accordance with the present invention.

The relationships of FIG. 8 are shown in a different type of graph in FIG. 9. As shown by dotted line segment 66 in FIG. 9 and solid line segment 66 in FIG. 8, there is a pump power operating regime that is avoided. In particular, in the example of FIGS. 8 and 9, control unit 44 avoids operating the pumps so that either pump power $P_1$ or $P_2$ is less than $P_{NTH}$. The pump power $P_2$ is dropped suddenly so that there is little or no significant opportunity for pump $P_2$ to be operated below $P_{NTH}$. The pump power $P_1$ is always above $P_{NTH}$, so this allows control unit 44 to completely avoid making $P_1$ less than $P_{NTH}$.

Figure 10:
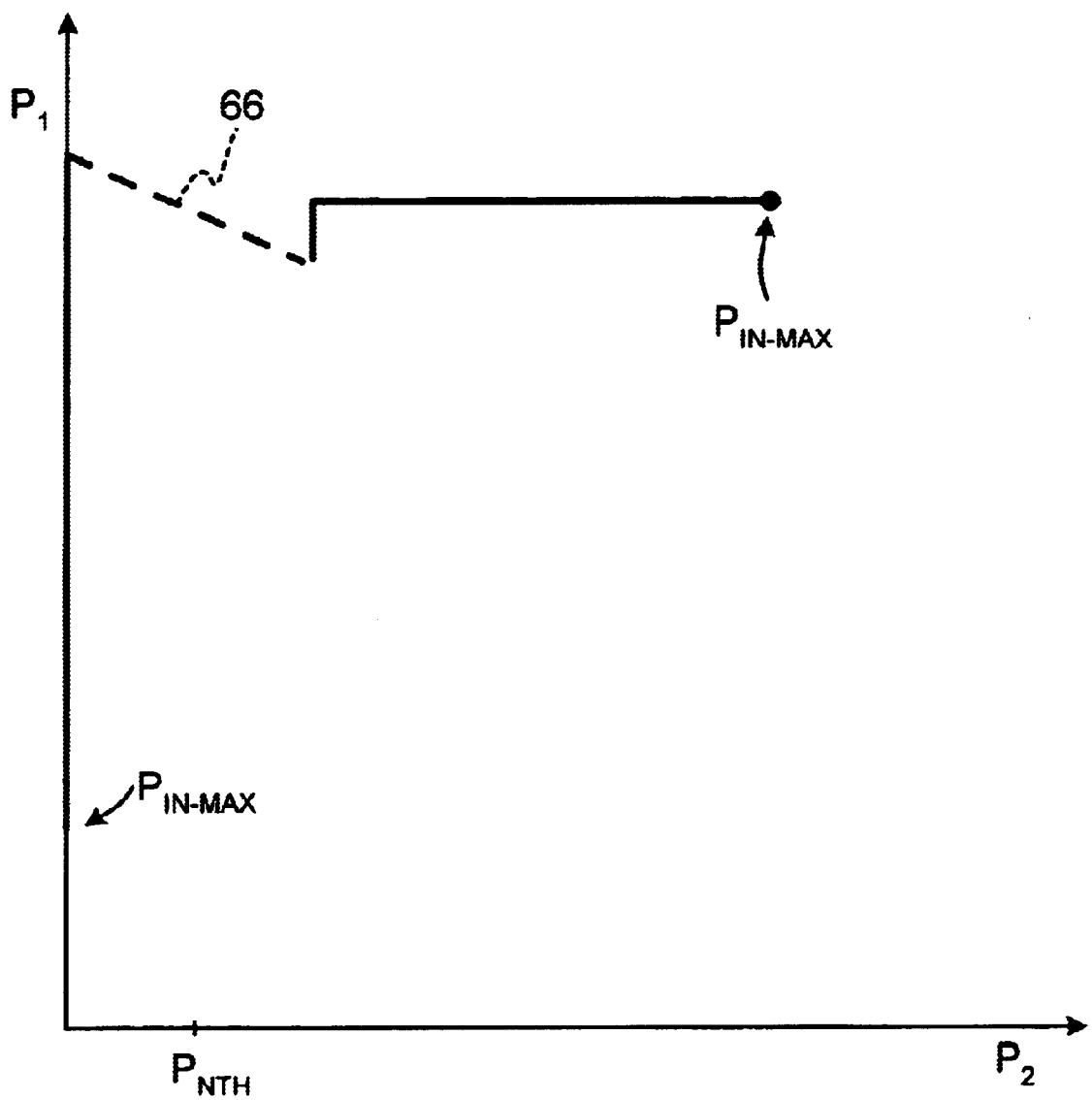
FIG. 10 is a graph showing another illustrative relationship between feed-forward pump power and measured input power that may be used when multiple pumps are controlled independently in an amplifier in accordance with the present invention.

In the example of FIGS. 8 and 9, the pump powers $P_1$ and $P_2$ are equal for high input powers. This is merely illustrative. If desired, $P_1$ may be higher than $P_2$ or $P_2$ may be higher than $P_1$. An illustrative pump power relationship that shows how the copump power $P_1$ may be ramped to its maximum before the counterpump power $P_2$ is turned on is shown in FIG. 10. With this type of configuration, the copump is strongly favored, which may improve the noise figure performance of coil 52. As shown by dotted line 66, control unit 44 may control pump powers $P_1$ and $P_2$ so that operation in the pump power regime in which $P_1$ or $P_2$ is below $P_{NTH}$ and in which the effects of mode partition noise tend to be significant is avoided. As the graph of FIG. 10 indicates, this may initially involve dropping $P_1$ as $P_2$ is increased rapidly from zero to an operating power above $P_{NTH}$ in response to increasing input powers $P_{IN}$.

The examples of FIGS. 8–10 are merely illustrative. Any suitable relationships may be used in selecting the powers $P_1$ and $P_2$ to ensure that the proper pump powers are used to pump coil 52 in response to measured input power (and feedback control signals) while ensuring that the noisy operating regime due to mode partition noise when $P_1$ or $P_2$ is less than $P_{NTH}$ is avoided.

Moreover, amplifiers 18 pumped by any number of laser diodes and having any suitable number of coils may use this type of approach. For example, the pumps for multiple coils in an amplifier 18 may be controlled so that one or more of the pumps are dropped suddenly at low input powers to avoid operating them in the regime in which mode partition noise is significant whereas one or more of the remaining active pumps are increased accordingly to compensate for the pump or pumps that are turned off.

Figure 11:
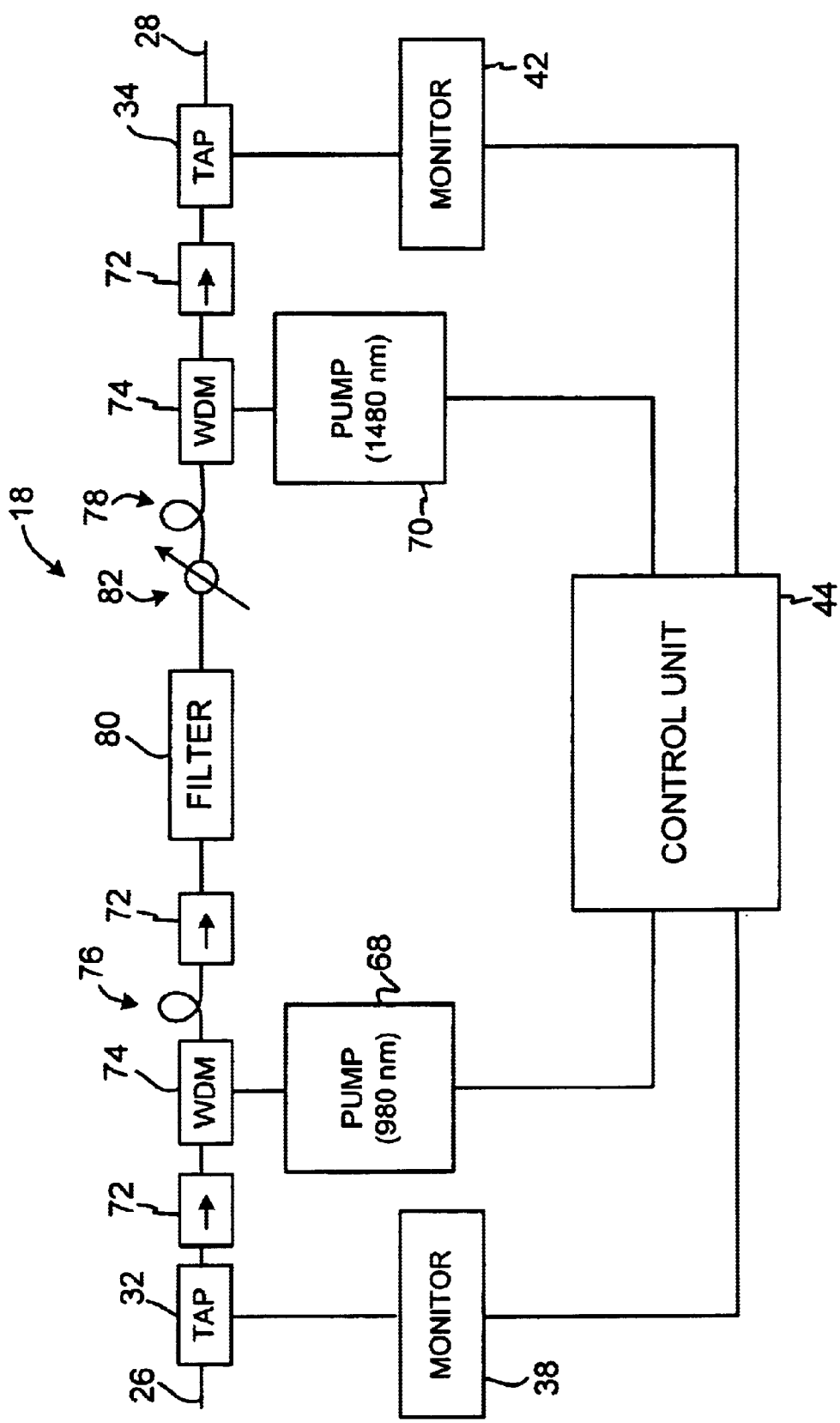
FIG. 11 is a schematic diagram of an illustrative amplifier with multiple coils and transient control capabilities in accordance with the present invention.

Amplifiers with multiple coils may also use other pump power control schemes. An illustrative amplifier 18 with multiple coils (e.g., rare-earth-doped fiber coils such as erbium-doped fiber coils or lengths) is shown in FIG. 11. In the example of FIG. 11, a first coil 76 is pumped by a 980 nm pump 68 and a second coil 78 is pumped by a 1480 nm pump 70. Pumps such as pumps 68 and 70 of FIG. 11 and the other drawings may be provided using single laser diodes or multiple laser diodes that have been combined using a pump combiner. Optical data signals to be amplified pass through coils 76 and 78 from input fiber 26 to output fiber 28. Pump couplers 74 such as wavelength-division-multiplexing couplers may be used to couple pump light from pumps 68 and 70 into coils 76 and 78. A filter 80 may be used to flatten or otherwise shape the gain or output power spectrum of amplifier 18. Variable optical attenuator 82 may be used to modify the signal power provided to coil 78 from coil 76, to ensure proper gain tilt for amplifier 18 regardless of the input power conditions at input 26 (e.g., regardless of the power present on each channel). Isolators 72 may be used to reduce noise due to backwards-traveling light. If desired, more gain stages may be used and additional components or different components or equipment may be used. For example, a dynamic spectral filter may be used instead of variable optical attenuator 82.

With the arrangement of FIG. 11, the pump power produced by pump 68 may be referred to as $P_1$ and the pump power produced by pump 70 may be referred to as $P_2$. The second coil 78 acts to control the output power of amplifier 18. Even if the output power from coil 76 is relatively high, for example, the output power of amplifier 18 will generally not be high if the pump power for coil 78 is low. This is because in the absence of strong pumping in the second coil, the optical absorption of coil 78 starts to serve as an attenuator instead of a gain stage. As a result, the power of the light exiting amplifier 18 is low when the pump power for coil 78 is low.

Figure 12:
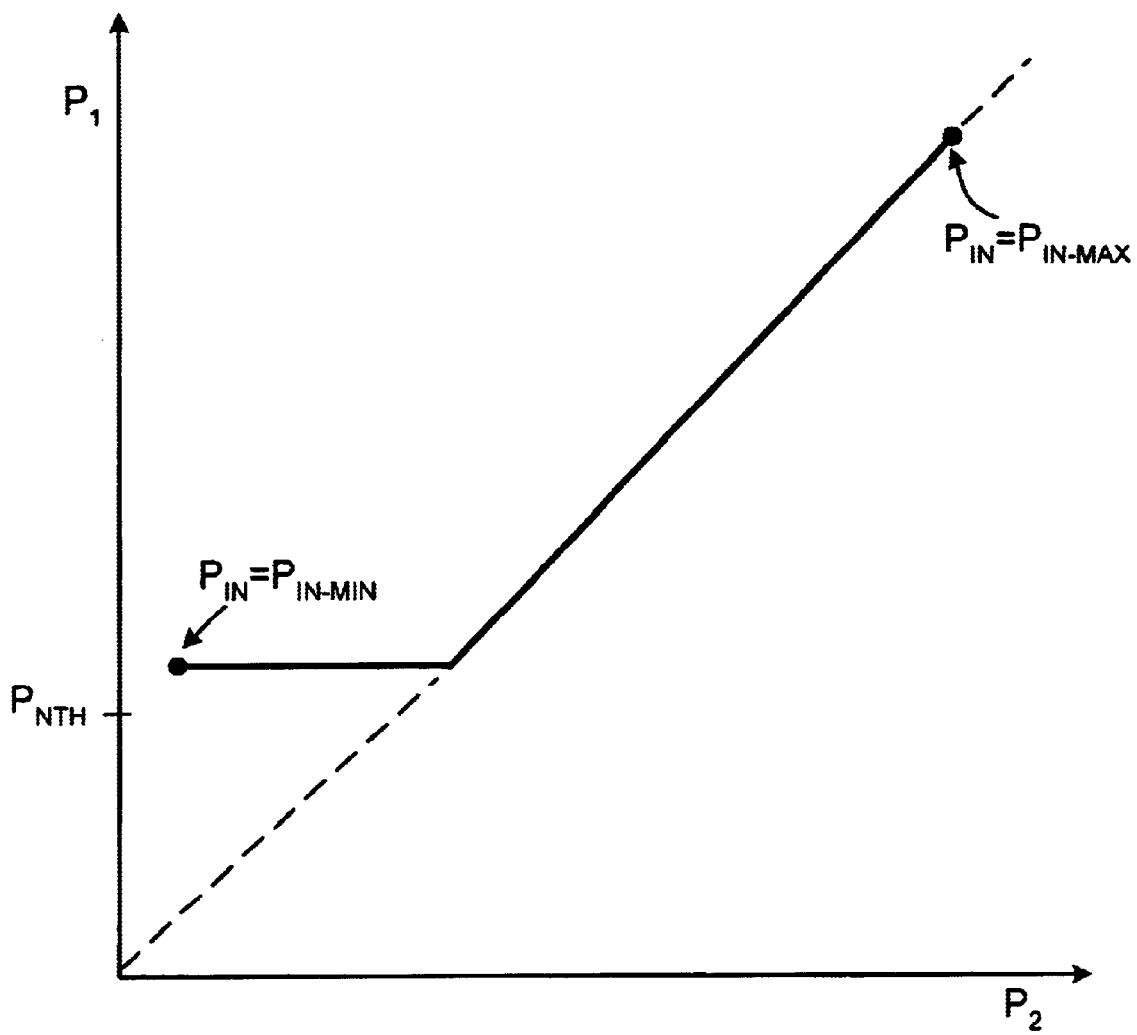
FIG. 12 is a graph of an illustrative relationship between feed-forward pump power and measured input power that may be used when the pumps for the coils of an amplifier such as the amplifier of FIG. 11 are adjusted to suppress transients in accordance with the present invention.

Laser diodes operating at 1480 nm tend to suffer less from mode partition noise than 980 nm pumps. Accordingly, the power $P_2$ of output stage pump 70 may be reduced to relatively low values without adversely affecting the output power or gain stability of amplifier 18 as much as would be the case if a 980 nm pump were used to pump coil 78. Pumps operating at 1480 nm in multiple coil configurations of the type shown in FIG. 11 such as pump 70 effectively do not have a noisy operating regime characterized by $P_{NTH}$, because such pumps may be operated at pump powers $P_2$ that are less than $P_{NTH}$ without producing undue amounts of pump-induced instabilities in the operation of amplifier 18. Control unit 44 may therefore adjust the pump powers $P_1$ and $P_2$ so that the effects of pump-induced instabilities are minimized. The impact of mode partition noise is minimized by maintaining $P_1$ above $P_{NTH}$ as shown in FIG. 12. The impact of mode partition noise is also minimized by adjusting $P_2$ as needed (even to powers below $P_{NTH}$), because low $P_2$ powers do not contribute as much to pump noise when 1480 nm pumps are used. Arrangements of the type shown in FIG. 11 in which the output stage is only pumped with 1480 nm pump light (e.g., from a single 1480 nm laser) when operating at low measured input powers to avoid undue pump noise may be used for single coil amplifiers and amplifiers with more than two coils if desired.

Figure 13:
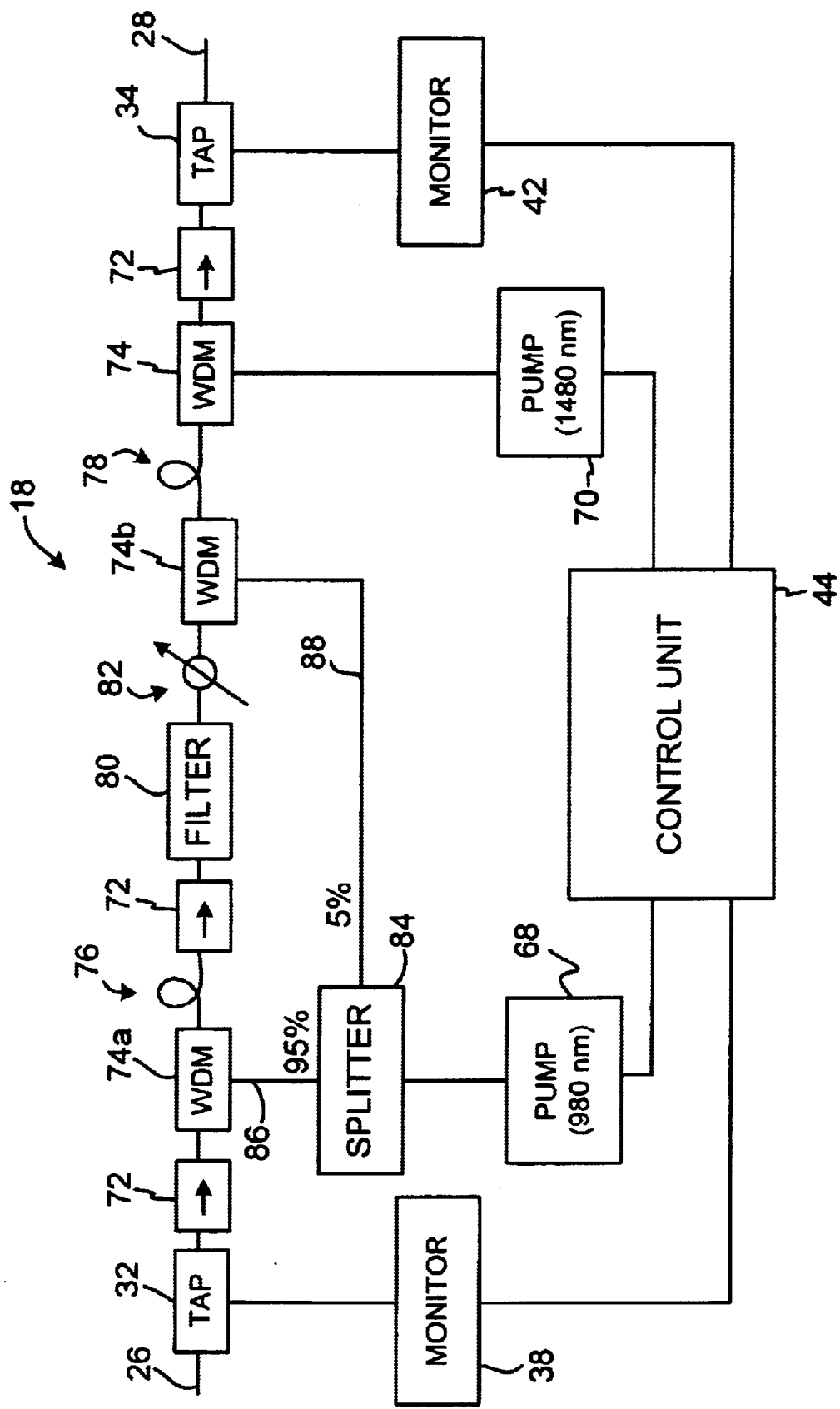
FIG. 13 is a schematic diagram of an illustrative amplifier with a split pump configuration and transient control capabilities in accordance with the present invention.

Another approach that allows the pump power for the downstream coil to be reduced without generating pump-induced noise involves sharing the pump power for the first and second coils. As shown in FIG. 13, for example, a pump splitting arrangement may be used to pump an amplifier with multiple coils. In the example of FIG. 13, pump power from pump 68 is divided into two paths by splitter 84. Splitter 84 may be any suitable optical splitter such as a splitter based on an inverted fused fiber tap. Most (e.g., 95%) of the pump light that is provided to splitter 84 is directed to path 86. Pump light from path 86 may be directed into coil 76 by wavelength-division-multiplexing coupler 74a or other suitable coupler. Some (e.g., the remaining 5%) of the pump light that is provided to splitter 84 may be directed to path 88. Pump light from path 88 may be directed into coil 78 by wavelength-division-multiplexing coupler 74b or other suitable pump coupler. Pump light may also be provided to coil 78 by pump 70. Pumps 68 and 70 may be 980 nm pumps, 1480 nm pumps, or other suitable pumps. It may be advantageous to use a 980 nm laser for pump 68 to improve the noise figure performance of coil 76. It may be advantageous to use a 1480 nm laser for pump 70 to improve power conversion efficiency.

With the approach of FIG. 13, the portion (e.g., the 5% portion) of pump light that is diverted to coil 78 from splitter 84 may be used to ensure that coil 78 is pumped even when pump 70 is turned off. Because only a small amount of pump light is pumped by this light (because in this example only 5% of the pump light from the first pump is diverted to the second coil), the amount of pumping of the second coil may be reduced to low levels when needed to accommodate low input powers. The portion of light diverted to the second coil is only a fraction of the pump light exiting laser 68, so laser 68 may be operated well above the noisy threshold power $P_{NTH}$ without over-pumping coil 78 or amplifier 18.

It may be advantageous for the fraction of pump light that is provided to the second coil 78 to be smaller than the fraction of pump light that is provided to the first coil 76, as this tends to ensure that coil 76 is pumped with a sufficiently high power to produce a low amplifier noise figure and tends to ensure that the pump power for the second coil may be reduced sufficiently without reducing the output power of pump 68 below $P_{NTH}$.

In normal high input power operations, pumps 68 and 70 may be operated near their maximum output powers. At moderate input powers the second pump 70 may be turned down before the first pump for improved noise figure performance. At low input powers, pump 70 need not be used, as sufficient pump light for the second coils is provided by the diverted light on path 88 from splitter 84. Because pump 70 is not needed at low input powers and because the pump power of pump 68 may be maintained at levels above $P_{NTH}$ even during operation under low measured input power conditions without over-pumping coil 78, the arrangement of FIG. 13 allows the control unit 44 to control the pumps 68 and 70 to produce powers $P_1$ and $P_2$ that avoid operation in regimes in which the mode partition noise of pumps 68 and 70 creates significant gain and output power instabilities.

Figure 14:
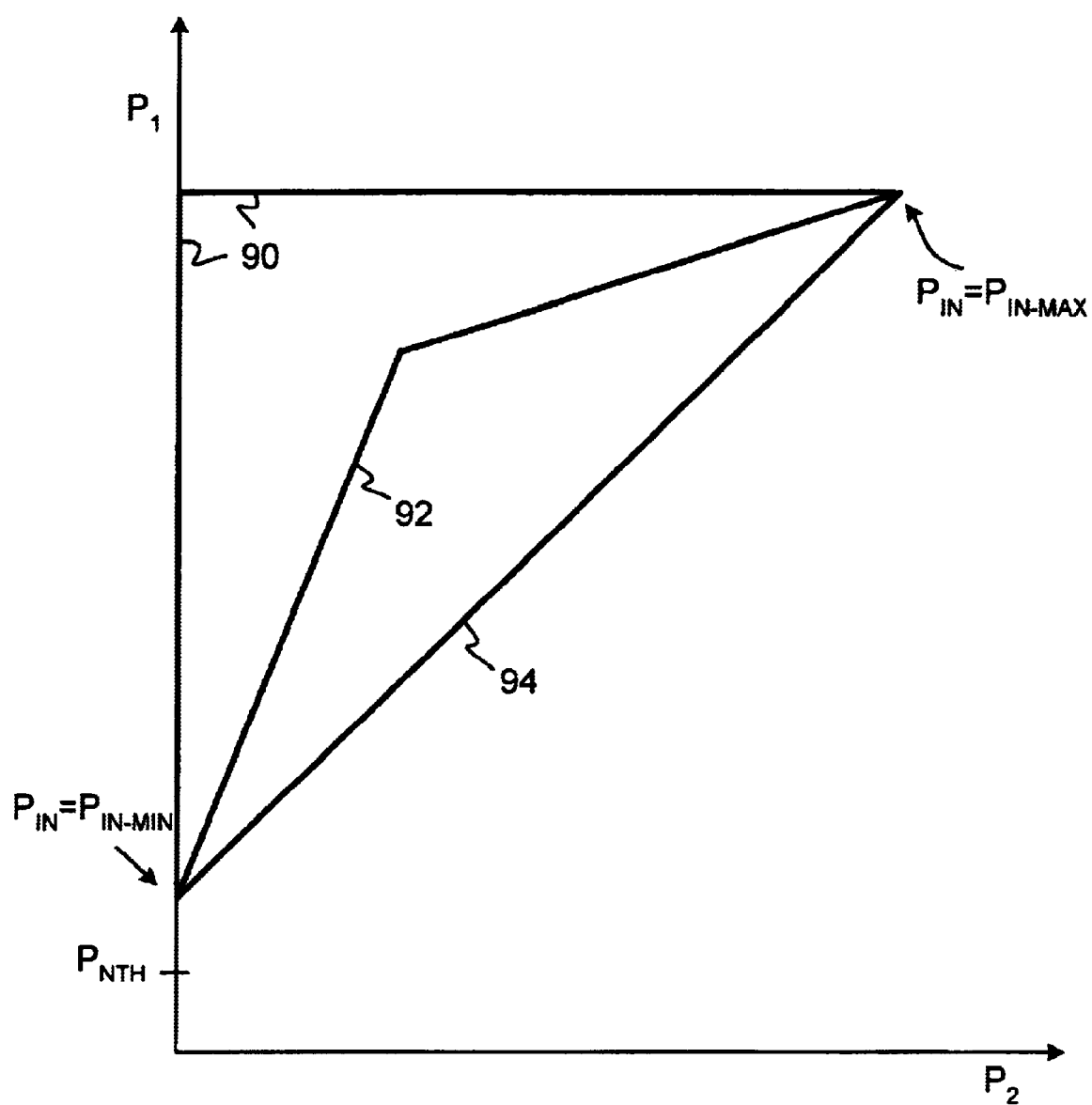
FIG. 14 is a graph of an illustrative relationship between feed-forward pump power and measured input power that may be used when adjusting pump powers to suppress transients in amplifiers in which pump light from a pump is shared between multiple coils in accordance with the present invention.

A graph showing several illustrative pump power curves 90, 92, and 94 that may be used to define the pump power relationships between pump powers $P_1$ (pump 68) and $P_2$ (pump 70) and measured input power $P_{IN}$ for amplifier 18 of FIG. 13 is shown in FIG. 14. Curves 90, 92, and 94 are examples of the types of curves that may be used when adjusting pump powers to suppress transients in amplifiers in which pump light from a pump is shared between coils. Other suitable pump power relationships may be used if desired.

Figure 15:
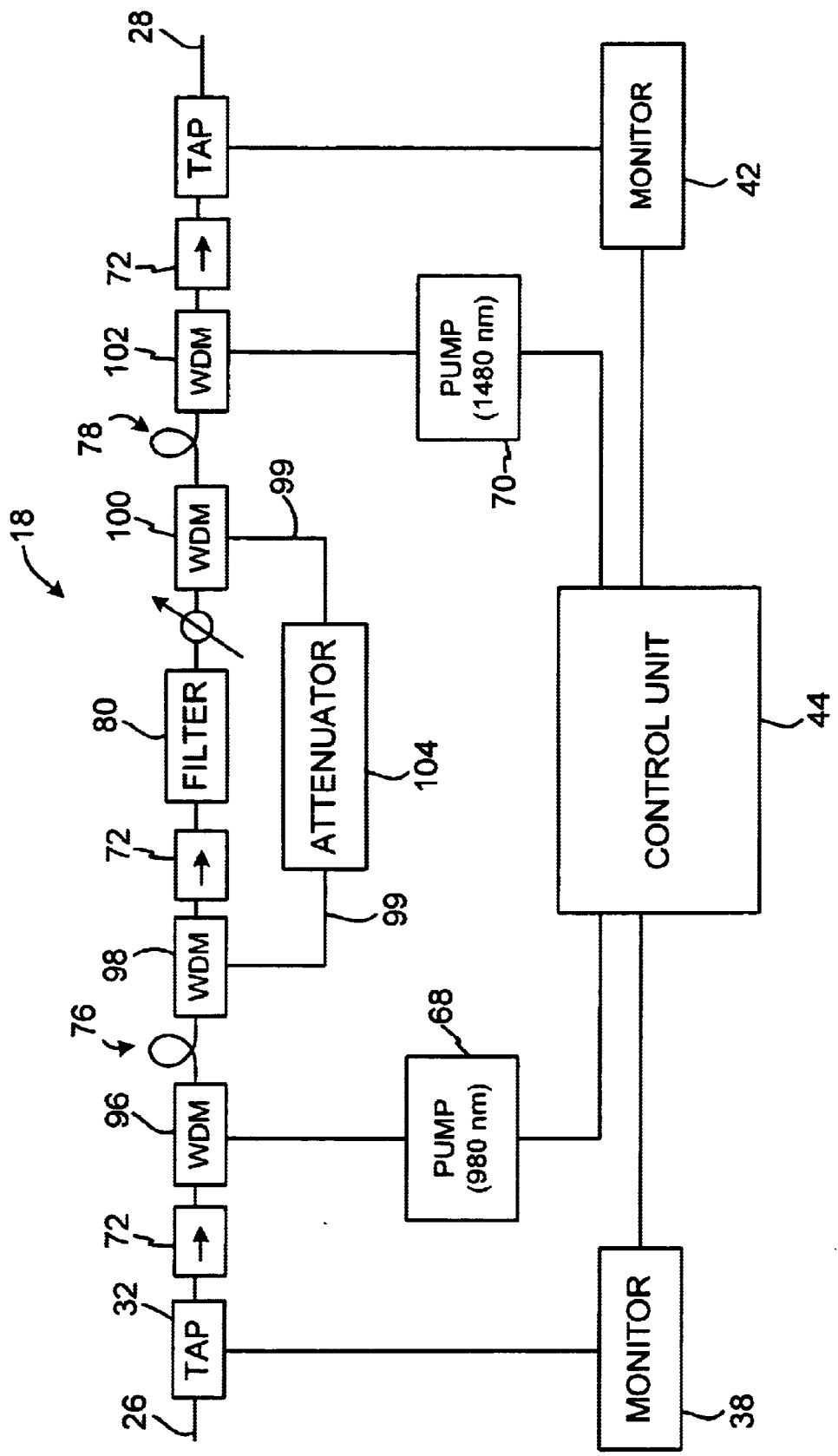
FIG. 15 is a schematic diagram of an illustrative amplifier with a remnant pump configuration and transient control capabilities in accordance with the present invention.

An illustrative amplifier 18 in which pump light from a single first coil pump is shared between coils using a remnant pump arrangement is shown in FIG. 15. In the configuration of FIG. 15, pump light from pump 68 is used to pump coil 76. Coil 76 may be based on a length of rare-earth-doped fiber such as erbium-doped fiber. Pump light from pump 68 is coupled into coil 76 by coupler 96. Not all of the light is absorbed by the rare-earth-doped fiber of coil 76, so remnant pump light is provided to path 99 by coupler 98. Path 99 may or may not contain an optional attenuator 104 for adjusting the power of the remnant pump light in path 99. Attenuator 104 may be based on an offset splice, a static or variable optical attenuator component, or any other suitable attenuator.

Coupler 100 may be used to merge the remnant pump light from bypass path 99 back into coil 78 in the main fiber path of amplifier 18. The remnant pump light may pump coil 78 at a reduced power relative to the pump power provided to the first coil (e.g., at a relatively small fraction such as 5–25% or other suitable amount of the power applied to coil 76). This allows the pump 68 to be operated at a relatively high power while pump 70 is turned off under low input power conditions. Pump noise due to mode partition noise in pump 68 is avoided because of the relatively high power of pump 68 and is avoided in pump 70, because pump 70 may be turned off due to the presence of the remnant pump light from pump 68.

In the arrangements of FIGS. 13 and 15, the presence of the shared pump light in the second coil prevents the second coil from becoming overly-absorptive as would generally occur in the absence of any pump light. The pump power relationships given by the curves of FIG. 14 or other suitable relationships may be used in adjusting the pump powers $P_1$ and $P_2$ for the pumps 68 and 70 of both FIGS. 13 and 15.

If desired, the use of 1480 nm pumping at the output stage of amplifier 18 may be used in amplifiers 18 having any suitable number of coils (e.g., a single coil, only two coils, or more than two coils). Amplifiers 18 with a single coil, only two coils, or with more than two coils may also use shared pumping schemes such as the shared pumping schemes of FIGS. 13 and 15. Any suitable lasers may be used to pump the coils in amplifiers 18 in any of these configurations. If desired, only two laser diode pumps may be used, as shown in some of the drawings, or more than two laser diode pumps may be used. Copumping and counter-pumping schemes may be used and lasers may operate at 980 nm, 1480 nm, or other suitable wavelengths.

Although some of the features of the present invention have been described in the context of optical amplifiers 18, this is merely illustrative. The features of the present invention may be used in controlling optically-pumped fiber in any suitable optical network equipment 20 if desired.

It will be understood that the foregoing is merely illustrative of the principles of this invention, and that various modifications can be made by those skilled in the art without departing from the scope and spirit of the invention.

What is claimed is:

1. An optical amplifier that amplifies optical signals in a fiber-optic communications link, comprising:

a first laser diode pump that produces pump light at a first pump power;

a second laser diode pump that produces pump light at a second pump power;

a rare-earth-doped fiber coil that is optically pumped by the first and second laser diode pumps to produce optical gain for the optical signals; and a control unit and at least one optical monitor that measure the optical signals in the amplifier, wherein the control unit controls the first and second laser diode pumps based on the measured optical signals to suppress gain transients, and wherein at low measured optical signal powers the control unit turns off the second pump while using the first pump to pump the coil to minimize the effects of laser diode mode partition noise on the optical amplifier.

2. The optical amplifier defined in claim 1 wherein the first and second laser diode pumps operate at wavelengths of 980 nm.

3. An optical amplifier that amplifies optical signals on a fiber-optic communications link, comprising:

a first coil of rare-earth-doped fiber;

a second coil of rare-earth-doped fiber;

a 980 nm laser diode pump that optically pumps the first coil at a first pump power to provide optical gain for the optical signals;

a 1480 nm laser diode pump that optically pumps the second coil at a second pump power to produce optical gain for the optical signals; and a control unit and at least one optical monitor that measure the optical signals in the amplifier, wherein the control unit controls the 980 nm and 1480 nm laser diode pumps based on the measured optical signals to suppress gain transients, and wherein at low measured optical signal powers the control unit uses only the 1480 nm laser diode pump to pump the second coil and controls the laser diode pumps to ensure that the first pump power is greater than the second pump power and to ensure that the first pump power is above a threshold level that minimizes mode partition noise effects in the 980 nm pump.

4. The optical amplifier defined in claim 3 wherein the optical amplifier has only the first and second coils to produce optical gain and wherein the first and second coils are erbium-doped fiber coils.

5. An optical amplifier that amplifies optical signals on a fiber-optic communications link, comprising:

a first coil of rare-earth-doped fiber;

a second coil of rare-earth-doped fiber;

a first laser diode pump that produces pump light at a first pump power;

a second laser diode pump that produces pump light at a second pump power that is provided to the second coil to optically pump the second coil;

an optical splitter that is optically coupled to the first laser diode pump and that splits the pump light from the first laser diode pump into first and second portions, wherein the first portion of the first pump light is provided to the first coil to optically pump the first coil and wherein the second portion of the first pump light is provided to the second coil to optically pump the second coil; and a control unit and at least one optical monitor that measure the optical signals in the amplifier, wherein the control unit controls the first and second laser diode pumps based on the measured optical signals to suppress gain transients, wherein at some measured optical signal powers the control unit uses only the first pump to pump the first and second coils to minimize laser diode mode partition noise effects in the optical amplifier.

6. An optical amplifier that amplifies optical signals on a fiber-optic communications link, comprising:

a first coil of rare-earth-doped fiber;

a second coil of rare-earth-doped fiber;

a first laser diode pump that produces pump light at a first pump power;

a second laser diode pump that produces pump light at a second pump power that is provided to the second coil to optically pump the second coil;

an optical splitter that is optically coupled to the first laser diode pump and that splits the pump light from the first laser diode pump into first and second portions, wherein the first portion of the first pump light is provided to the first coil to optically pump the first coil and wherein the second portion of the first pump light is provided to the second coil to optically pump the second coil; and a control unit and at least one optical monitor that measure the optical signals in the amplifier, wherein the control unit controls the first and second laser diode pumps based on the measured optical signals to suppress gain transients, wherein at low measured optical signal powers the control unit uses only the first pump to pump the first and second coils to minimize laser diode mode partition noise effects in the optical amplifier.

7. The optical amplifier defined in claim 5 wherein the first portion is larger than the second portion.

8. The optical amplifier defined in claim 5 wherein the first laser diode pump comprises a 980 nm laser diode pump.

9. The optical amplifier defined in claim 5 wherein the second laser diode pump comprises a 1480 nm laser diode pump.

10. The optical amplifier defined in claim 5 wherein the first laser diode pump comprises a 980 nm laser diode pump, wherein the second laser diode pump comprises a 1480 nm pump, and wherein the first portion is greater than the second portion.

11. The optical amplifier defined in claim 5 wherein the first laser diode pump comprises a 980 nm laser diode pump, wherein the second laser diode pump comprises a 1480 nm pump, wherein the first portion is greater than the second portion, wherein the optical amplifier has only the first and second coils to produce optical gain, and wherein the first and second coils are erbium-doped fiber coils.

12. An optical amplifier that amplifies optical signals on a fiber-optic communications link, comprising:

a first coil of rare-earth-doped fiber;

a second coil of rare-earth-doped fiber;

a first laser diode pump that produces pump light at a first pump power, wherein the pump light at the first pump power is provided to the first coil to optically pump the first coil, and wherein remnant pump light is left over after pumping the first coil with the pump light at the first pump power;

a second laser diode pump that produces pump light at a second pump power that is provided to the second coil to optically pump the second coil;

an optical fiber that provides the remnant pump light from the first coil to the second coil to optically pump the second coil; and a control unit and at least one optical monitor that measure the optical signals in the amplifier, wherein the control unit controls the first and second laser diode pumps based on the measured optical signals to suppress gain transients, wherein at some measured optical signal powers the control unit uses only the first pump to pump the first and second coils to minimize laser diode mode partition noise effects in the optical amplifier.

13. The optical amplifier defined in claim 12 wherein the measured optical signals include measured input signals and measured output signals and wherein the control unit controls the first and second laser diode pumps based on the measured optical signals using a hybrid control technique that includes feed-forward and feedback pump power contributions.

14. The optical amplifier defined in claim 12 wherein the first laser diode pump comprises a 980 nm laser diode pump.

15. The optical amplifier defined in claim 12 wherein the second laser diode pump comprises a 1480 nm laser diode pump.

16. The optical amplifier defined in claim 12 wherein the first laser diode pump comprises a 980 nm laser diode pump and wherein the second laser diode pump comprises a 1480 nm pump.

17. The optical amplifier defined in claim 12 wherein the optical amplifier has only the first and second coils to produce optical gain and wherein the first and second coils are erbium-doped fiber coils.

18. The optical amplifier defined in claim 12 further comprising an optical filter, wherein the optical fiber is coupled between the first coil and the second coil to form a bypass path past the optical filter.

19. An optical amplifier that amplifies optical signals in a fiber-optic communications link, comprising:

a first coil of rare-earth-doped fiber;

a second coil of rare-earth-doped fiber;

a first laser diode pump that produces pump light at a first pump power;

a second laser diode pump that produces pump light at a second pump power;

a coupler that receives the pump light from the first and second laser diode pumps and distributes the pump light to the first and second coils of rare-earth-doped fiber; and a control unit and at least one optical monitor that measure the optical signals in the amplifier, wherein the control unit controls the first and second laser diode pumps based on the measured optical signals to suppress gain transients, and wherein at low measured optical signal powers the control unit turns off the second pump while using the first pump to pump the coil to minimize the effects of laser diode mode partition noise on the optical amplifier.

* * * * *